United States Patent Office 3,365,651
Patented Jan. 23, 1968

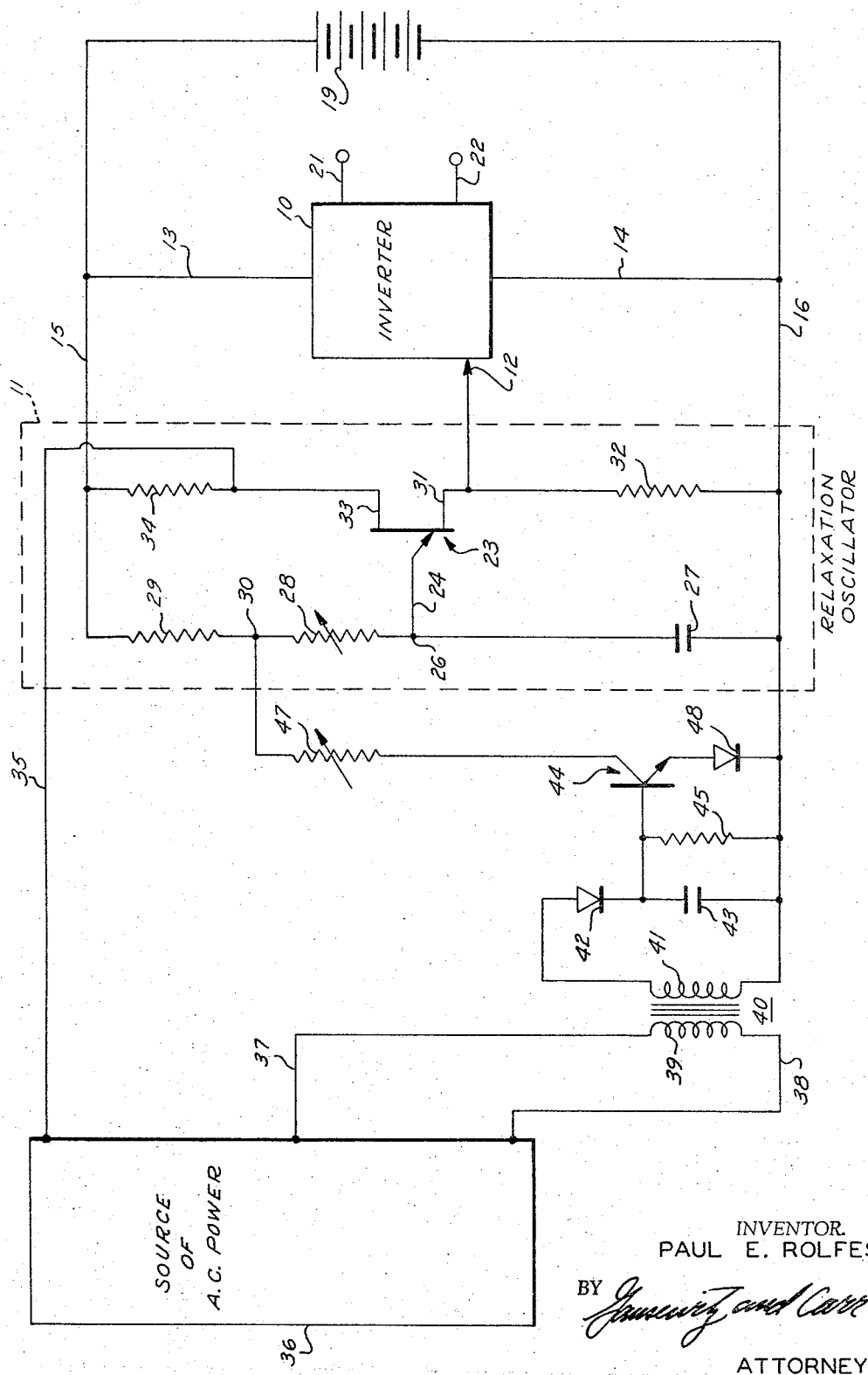

3,365,651
APPARATUS AND METHOD FOR SYNCHRONIZING AN INVERTER TO A SOURCE OF A.C. POWER
Paul E. Rolfes, Costa Mesa, Calif., assignor, by mesne assignments, to Lorain Products Corporation, Lorain, Ohio, a corporation of Ohio
Filed Jan. 16, 1964, Ser. No. 338,109
5 Claims. (Cl. 321—43)

This invention relates to an apparatus and method for synchronizing an inverter, and the relaxation oscillator driving the same, to a source of A.C. power.

It frequently is necessary to synchronize an inverter to another source of A.C. power, such as a second inverter or an A.C. power line, despite the fact that the inverter to be synchronized has a free-running frequency equal to or greater than the frequency of the second power source. Reference is made, for example, to co-pending patent application Ser. No. 337,621, filed Jan. 14, 1964, for a Continuously-Operating Standby Power Supply and Battery-Charging Apparatus and Method, inventor Robert S. Jamieson. Such application relates to a standby power-supply system which is synchronized to the power line at substantially all times, and which continues to supply power (desirably at the 60-cycle frequency) after the line fails. It is pointed out that it may be necessary to synchronize the standby system to the line while the line is being supplied by a diesel-powered generator, during extended periods of power failure. Such a generator may be characterized by a relatively wide frequency swing, such as plus or minus three cycles per second.

An inverter which is driven by a relaxation oscillator must normally, for reasons well known to the art, be synchronized to a frequency higher than the free-running frequency of the oscillator (and inverter). For this reason, it has previously been thought that the inverter to be synchronized should not have a free-running frequency equal to the frequency of the A.C. source from which the sync signal is to be derived. Particularly when the frequency of the A.C. source varies considerably (such as plus or minus one cycle per second relative to conventional A.C. power lines, or plus or minus three or more cycles per second relative to diesel-powered generators), the problem of insuring that synchronization will occur, while still maintaining the free-running frequency equal to the synchronized frequency, is one which has presented substantial difficulties to workers in the art.

In view of the above, it is a principal object of the present invention to provide a method and apparatus for syichronizing to an A.C. power source an oscillator and inverter having a free-running frequency equal to or greater than that of said source.

Another object of the invention is to provide a method and apparatus for synchronizing an inverter to an A.C. power source the frequency of which varies through a considerable range.

Another object of the invention is to provide a method and apparatus for depressing automatically the frequency of an inverter in response to the presence of a sync signal from an A.C. power source.

These and other objects will become apparent from the following detailed description taken in connection with the attached single-figure drawing which comprises a wiring diagram illustrating schematically an embodiment of the present invention.

Referring to the drawing, the inverter to be synchronized is indicated schematically at 10 and may, for example, comprise a parallel square-wave SCR inverter of the type described on page 152 et seq. of the General Electric SCR Manual, second edition. Such inverter may be driven by a suitable relaxation oscillator, such as the unijunction transistor oscillator described on page 46 et seq. of such manual. A unijunction transistor oscillator of the general type referred to is indicated at 11, having an output lead 12 which feeds into the inverter 10.

The power terminals of inverter 10 are connected through leads 13 nad 14 to positive and negative D.C. leads 15 and 16, respectively. Such leads are supplied with D.C. power, for example from the positive and negative terminals of a storage battery 19. The energy received by the inverter 10 from battery 19 is converted into A.C. power, the A.C. output being supplied through leads 21 and 22 to a load, not shown.

The unijunction transistor relaxation oscillator 11 is illustrated to comprise a unijunction transistor 23 the emitter 24 of which is connected to the junction 26 between a capacitor 27 and a variable resistor or rheostat 28. The remaining terminal of capacitor 27 is connected to the negative lead 16, whereas the remaining terminal of the resistor 28 is connected through a resistor 29 to positive lead 15. The junction between resistors 28 and 29 is designated 30.

Base-one of the unijunction transistor 23 is indicated at 31, and is connected through a resistor 32 to negative lead 16. Base-two is shown at 33, being connected through a resistor 34 to positive lead 15.

The value of variable resistor 28 is preferably large in comparison ot the value of resistor 29. Thus, the free-running frequency of oscillator 11 may be varied, through a relatively wide range, by adjusting the setting of resistor 28. When the variable resistor or rhheostat 28 is set to a high value, the rate of charging of capacitor 27 from D.C. leads 15 and 16 is low, and the frequency of oscillation is accordingly low. On the other hand, when rheostat 28 is set to a low value, the rate of charging of capacitor 27 is high to produce a high frequency of oscillation.

As soon as the voltage at junction 26 reaches a predetermined value, transistor 23 becomes operative to effect discharge of capacitor 27 through resistor 32, after which the cycle repeats. As described on page 50 et seq. of the General Electric SCR Manual, second edition, firing can be effected at any intermediate part of the cycle by supplying a sync pulse through a lead 35 to the junction between resistor 34 and base-two 33. The synchronization thus achieved is, however, not possible unless (as indicated previously) the frequency of the sync source is greater than the natural or free-running frequency of oscillator 11 (as determined by the setting of rheostat 28, and the magnitude of capacitor 27). Thus, it will be understood that if a sync pulse is not delivered until after the voltage at junction 26 has built up to the value necessary to initiate discharge of the capacitor through transistor 23, such sync pulse will be of no effect.

The sync signal supplied through lead 35 may be derived from any suitable source of A.C. power for example an A.C. powerline, a second inverter, or a diesel-powered generator. Such a source is indicated schematically at 36, and is connected not only to the sync lead 35 but also to output leads 37 and 38 between which is connected the primary 39 of a transformer 40.

One terminal of the secondary 41 of transformer 40 is connected to negative lead 16, whereas the other terminal is connected to the anode of a diode 42. The cathode of such diode is connected through a capacitor 43 to lead 16. The junction between the diode and capacitor is connected to the base of an NPN transistor 44, there being a resistor 45 connected between such base and lead 16.

A second variable resistor or rheostat 47 is connected between junction 30 and the collector of transistor 44.

The emitter of transistor 44 is connected to the anode of a diode 48, the cathode of such diode being connected to the negative lead.

*Description of the method*

In the absence of a power output through leads 37 and 38 from source 36, transistor 44 is maintained in cut-off condition due to the back-biasing caused by the diode 48 and base-return resistor 45. Transistor 44 being cut off, there is no flow of current through resistor 47, so that the oscillator 11 operates at its own free-running frequency which is determined by the setting of resistor 28. Such free-running frequency is, desirably, the same as the normal frequency of the power source 36, such as 60 cycles per second. Were it not for the present invention, such free-running frequency would necessarily be substantially less than that of power source 36, so that failure of source 36 would result in a lowering of the frequency of oscillator 11 and thus of the inverter 10 controlled thereby.

Power source 36 then is applied to energize the transformer 40, the output wave from the transformer being rectified by the diode 42 (or equivalent rectifying means) and filtered by capacitor 43. Accordingly, there is present between the base of transistor 44 and the negative lead 16 a D.C. voltage which is relatively free of a large ripple. The turns ratio of transformer 40, the voltage delivered by battery 19, and other factors, are so related that the voltage developed between the base of transistor 44 and the negative lead 16 due to application of power from source 36 is sufficiently great to overcome the bias on transistor 44, thereby causing the same to be in saturated condition.

Upon saturation of transistor 44, current is conducted from junction 30 through resistor 47, transistor 44, and diode 48 to lead 16. The resulting additional flow of current through resistor 29 increases the voltage drop thereacross, so that the voltage at junction 30 is lower than during periods when the transistor is cut off. The voltage at junction 30 being thus reduced, the rate of current flow through variable resistor 28 to capacitor 27 is lowered, and the charge time of the capacitor accordingly increased to reduce the free-running frequency of the oscillator.

The setting of variable resistor 47 is such that the free-running frequency of oscillator 11 will be reduced to a value slightly lower than the minimum frequency of source 36. For example, if source 36 is an A.C. power line, characterized by a frequency variation of plus or minus one cycle per second from the normal 60-cycle frequency, the value of resistor 47 may be so adjusted that application of power from source 36 reduces the free-running frequency of the oscillator from 60 cycles to 58 cycles.

The free-running frequency of oscillator 11 having thus been reduced below the minimum frequency of power source 36, the sync signal which is supplied through lead 35 upon application of source 36 is operative to synchronize the frequency of oscillator 11 to the precise frequency of source 36. Thus, it will be understood that the lowering of the actual operating frequency of oscillator 11 need be only momentary, just long enough for the sync signal delivered through lead 35 to become operative to synchronize the oscillator to the frequency of source 36. It is to be noted, however, that the application of power through leads 37 and 38 from source 36 to transistor 44 must be continued throughout the entire period when synchronization is desired.

Upon removal of the power source 36, the D.C. voltage across capacitor 43 decays through resistor 45, causing transistor 44 to cut off due to the indicated bias circuit through resistor 45. Current flow through resistor 47 will thus cease, and oscillator 11 will continue oscillating at its normal free-running frequency determined by the setting of resistor 28. The same condition would occur if power from source 36 were continued, to energize sync lead 35, and either lead 37 or 38 were broken.

From the above it will be understood that the invention provides a method and apparatus for decreasing the free-running frequency of a relaxation oscillator in order to permit synchronization thereof to the frequency of a second power source, such decrease in free-running frequency being in response to a voltage derived from such second source. The decrease in free-running frequency is achieved in a simple and economical manner, and is variable in order to permit the degree of frequency decrease to be adjusted in accordance with the minimum frequency supplied by the second power source.

It is also within the scope of the invention to supply to junction 30 a D.C. voltage which is a function of the frequency of the source 36, the relationship being such that the free-running frequency of oscillator 11 may be either increased or decreased. Thus, a positive voltage may be supplied at junction 30 in order to increase the frequency of oscillation, or a negative voltage may be supplied at junction 30 in order to decrease the frequency of oscillation.

It is to be understood that the relaxation oscillator 11 may be operated at double the frequency of source 36, for example by incorporating in the sync lead 35 a suitable frequency-doubling circuit such as the one described in the above-cited co-pending patent application. In such event, the free-running frequency of oscillator 11 is caused to be double that indicated previously. Inverter 10 may then incorporate a flip-flop or other suitable means to cut the frequency in half prior to supplying trigger signals to the gates of the inverter, as described on pages 155 and 156 of the General Electric SCR Manual, second edition. For purposes of simplicity of description, the present specification and claims have been written as though no such frequency doubling or frequency halving means were employed, but such claims are to be interpreted as covering these equivalent circuits.

It is to be understood that various alternative transistor-biasing means, and various heat compensating means, may be employed. For example, diode 48 may be omitted.

A resistor may be incorporated in the lead to the base of transistor 44, to prevent damage to the transistor due to excessive current flow.

The foregoing detailed description is to be clearly understood as given by way of illustration and example only, the spirit and scope of this invention being limited solely by the appended claims.

I claim:
1. An oscillator and synchronizing circuit adapted to be employed in conjunction with a source of A.C. power, which comprises:
   a relaxation oscillator having a series-connected resistor and capacitor adapted to determine the free-running frequency of oscillation,
      said relaxation oscillator being adapted to be connected to a D.C. voltage source,
      said resistor and capacitor having such magnitudes that said free-running frequency is substantially equal to the frequency of an A.C. power source to which it is desired to synchronize said oscillator,
   a second resistor connected in series between said first-mentioned resistor and said D.C. voltage source from which said capacitor is charged, whereby an increase in the rate of current flow through said second resistor increases the voltage drop thereacross,
   means responsive to the presence of a voltage wave at said source of A.C. power to effect an increase in the flow of current through said second resistor,
      said means including a circuit independent of said capacitor,
      said increase being sufficient to lower the frequency of said relaxation oscillator to a value lower than that of said A.C. power source, and
   means responsive to the presence of a voltage wave at said A.C. power source to deliver a sync signal to said oscillator and thus synchronize said oscillator to the frequency of said source.

2. The invention as claimed in claim 1, in which said means responsive to the presence of a voltage wave at said A.C. power source to increase flow of current through said second resistor comprises:
- a third resistor one terminal of which is connected to the junction between said first-mentioned resistor and said second resistor,
- a transistor connected between said third resistor and ground in such manner that saturation of said transistor effects current flow through said third resistor and thus increases the flow of current through said second resistor, and
- circuit means to maintain said transistor in cut-off condition at all times except during periods when an A.C. voltage wave is present at said source of A.C. power.

3. The invention as claimed in claim 2, in which said circuit means comprises:
- a transformer connected to said A.C. power source,
- rectifier means to rectify the output of said transformer,
- filter means to smooth the output of said transformer, and
- a resistor connected between the base and emitter of said transistor to maintain the same in cut-off condition except during periods when the bias created by said resistor is overcome by the D.C. voltage produced at said rectifier and filter.

4. The invention as claimed in claim 2, in which said oscillator is a unijunction transistor relaxation oscillator, and in which said first-mentioned resistor and said third resistor are variable.

5. The invention as claimed in claim 1, in which an inverter is provided and is supplied with trigger signals from said oscillator, and in which a battery is connected to the input of said inverter and is also connected to said capacitor and to said second resistor to provide said D.C. voltage source effecting charging of said capacitor.

References Cited

UNITED STATES PATENTS

| | | | |
|---|---|---|---|
| 3,075,136 | 1/1963 | Jones | 321—45 |
| 3,183,372 | 5/1965 | Chin | 307—88.5 |
| 3,263,157 | 7/1966 | Klein | 323—22 |
| 2,940,052 | 6/1960 | Van Winkle | 331—153 |

FOREIGN PATENTS 242,145  12/1962  Australia.

OTHER REFERENCES

General Electric, "Silicon Controlled Rectifier Manual," 2nd ed., pp. 50 and 51, December 1961.

JOHN F. COUCH, *Primary Examiner.*

W. SHOOP, *Assistant Examiner.*